United States Patent
Baptist et al.

(10) Patent No.: US 10,229,002 B2
(45) Date of Patent: *Mar. 12, 2019

(54) PROCESS TO MIGRATE NAMED OBJECTS TO A DISPERSED OR DISTRIBUTED STORAGE NETWORK (DSN)

(71) Applicant: International Business Machines Corporation, Armonk, NY (US)

(72) Inventors: Andrew D. Baptist, Mt. Pleasant, WI (US); Franco V. Borich, Naperville, IL (US); Wesley B. Leggette, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 74 days.

This patent is subject to a terminal disclaimer.

(21) Appl. No.: 15/432,642

(22) Filed: Feb. 14, 2017

(65) Prior Publication Data

US 2017/0153946 A1 Jun. 1, 2017

Related U.S. Application Data

(63) Continuation-in-part of application No. 15/095,558, filed on Apr. 11, 2016, now Pat. No. 10,013,203, (Continued)

(51) Int. Cl.
*H04L 29/08* (2006.01)
*G06F 3/06* (2006.01)
*G06F 11/10* (2006.01)

(52) U.S. Cl.
CPC ........ *G06F 11/1076* (2013.01); *G06F 3/0604* (2013.01); *G06F 3/064* (2013.01);
(Continued)

(58) Field of Classification Search
CPC ............. G06F 11/1068; G06F 11/1076; G06F 11/1012; G06F 11/1044; G06F 11/1008; H03M 13/13; H03M 13/45; H03M 13/458
(Continued)

(56) References Cited

U.S. PATENT DOCUMENTS 4,092,732 A 5/1978 Ouchi
5,454,101 A 9/1995 Mackay et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — James C Kerveros
(74) *Attorney, Agent, or Firm* — Garlick & Markison; Timothy W. Markison; Shayne X. Short

(57) ABSTRACT

A computing device includes an interface configured to interface and communicate with a dispersed storage network (DSN), a memory that stores operational instructions, and a processing module operably coupled to the interface and memory such that the processing module, when operable within the computing device based on the operational instructions, is configured to perform various operations. The computing device receives data object information for a data object and stores the data object information in a dispersed index of a dispersed or distributed storage network (DSN). The computing device also dispersed error encodes the data object to generate sets of encoded data slices (EDSs) (e.g., for data segments of the data object) and updates the index entry state of the dispersed index to moving to indicate that the data object is moving. The computing device distributedly stores the sets of EDSs among a storage units (SUs) of the DSN.

20 Claims, 7 Drawing Sheets

Related U.S. Application Data which is a continuation-in-part of application No. 14/088,794, filed on Nov. 25, 2013, now Pat. No. 9,311,187.

(60) Provisional application No. 61/748,891, filed on Jan. 4, 2013.

(52) U.S. Cl.
CPC ............ *G06F 3/067* (2013.01); *G06F 3/0608* (2013.01); *G06F 3/0619* (2013.01); *G06F 3/0644* (2013.01); *G06F 3/0652* (2013.01); *G06F 11/1068* (2013.01); *H04L 67/1097* (2013.01); *G06F 2211/1028* (2013.01)

(58) Field of Classification Search
USPC ......................................................... 714/763
See application file for complete search history.

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 8,612,830 B2* | 12/2013 | Kitahara ............. | G06F 11/1068 711/103 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2008/0288814 A1* | 11/2008 | Kitahara ............. | G06F 11/073 714/5.1 |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2010/0251075 A1 | 9/2010 | Takahashi et al. | |
| 2012/0072806 A1* | 3/2012 | Tabata ................ | G06F 11/1048 714/773 |
| 2013/0159815 A1* | 6/2013 | Jung ...................... | G06F 11/10 714/773 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

(56) References Cited

OTHER PUBLICATIONS

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

* cited by examiner

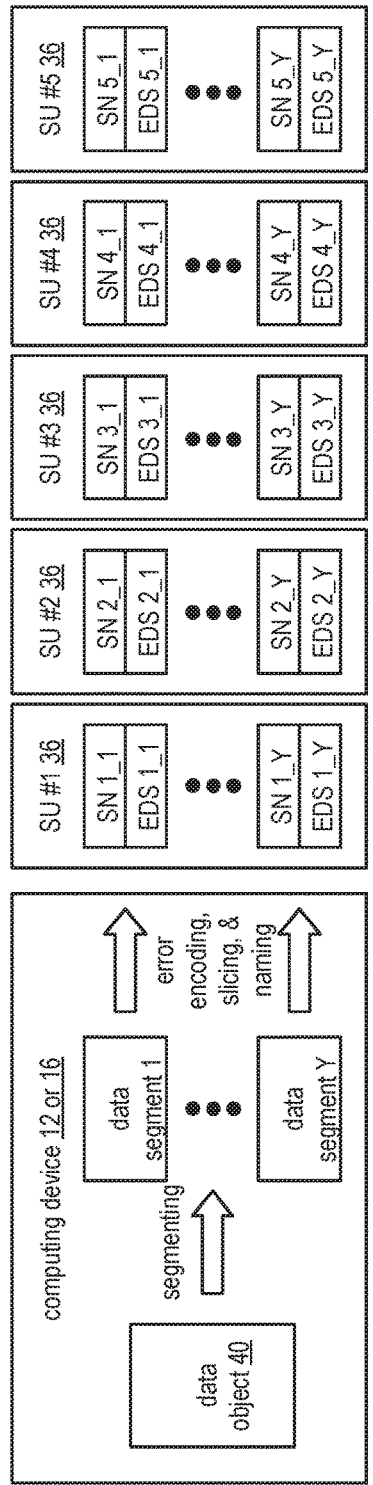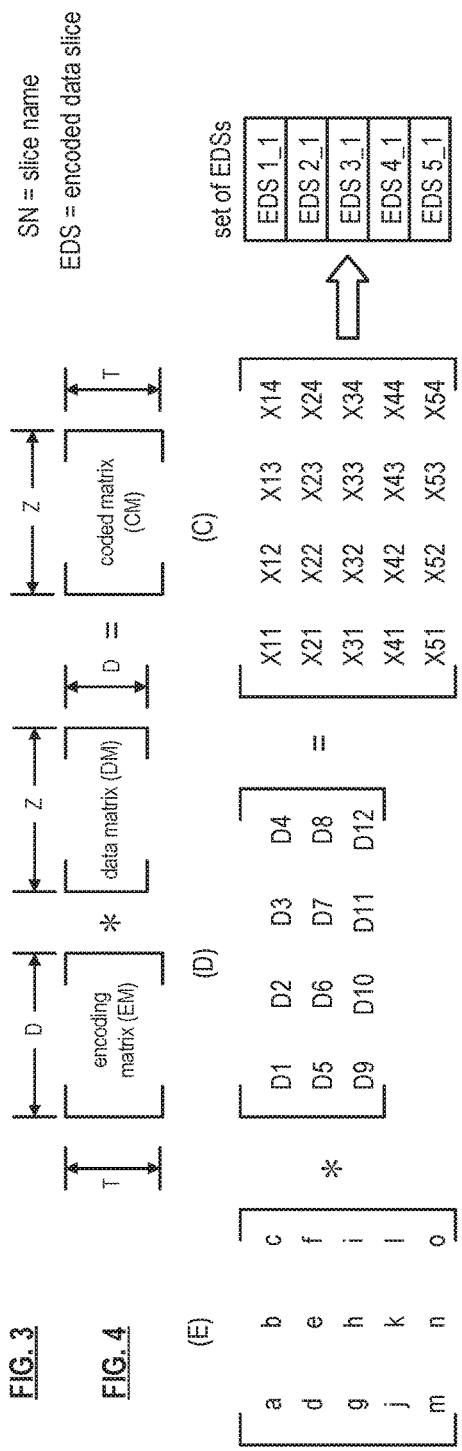

PROCESS TO MIGRATE NAMED OBJECTS TO A DISPERSED OR DISTRIBUTED STORAGE NETWORK (DSN)

CROSS REFERENCE TO RELATED PATENTS

The present U.S. Utility patent application claims priority pursuant to 35 U.S.C. § 120, as a continuation-in-part (CIP) of U.S. Utility patent application Ser. No. 15/095,558, entitled "ACHIEVING STORAGE COMPLIANCE IN A DISPERSED STORAGE NETWORK," filed Apr. 11, 2016, pending, which claims priority pursuant to 35 U.S.C. § 120, as a continuation-in-part (CIP) of U.S. Utility patent application Ser. No. 14/088,794, entitled "ACHIEVING STORAGE COMPLIANCE IN A DISPERSED STORAGE NETWORK," filed Nov. 25, 2013, now issued as U.S. Pat. No. 9,311,187 on Apr. 12, 2016, which claims priority pursuant to 35 U.S.C. § 119(e) to U.S. Provisional Application No. 61/748,891, entitled "OBFUSCATING AN ENCRYPTION KEY IN A DISPERSED STORAGE NETWORK," filed Jan. 4, 2013, all of which are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

In general, data storage systems include data that is stored therein. There may be various types of data storage systems in some instances, yet the prior art does not provide adequate means for interaction between those various types of data storage systems. There continues to be a need for improvement within data storage systems including a need for improvement in manners in which they can interact with one another.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
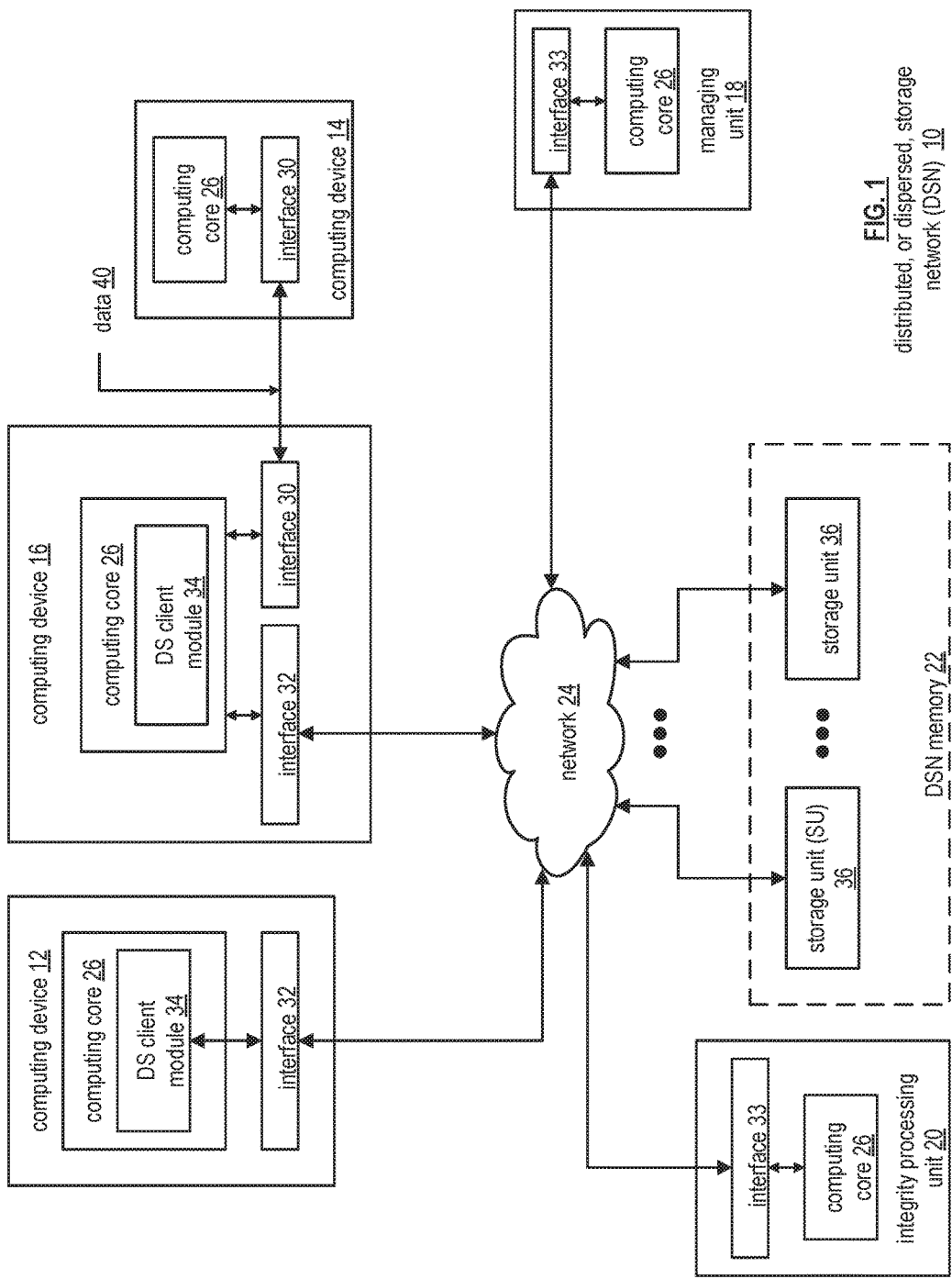
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
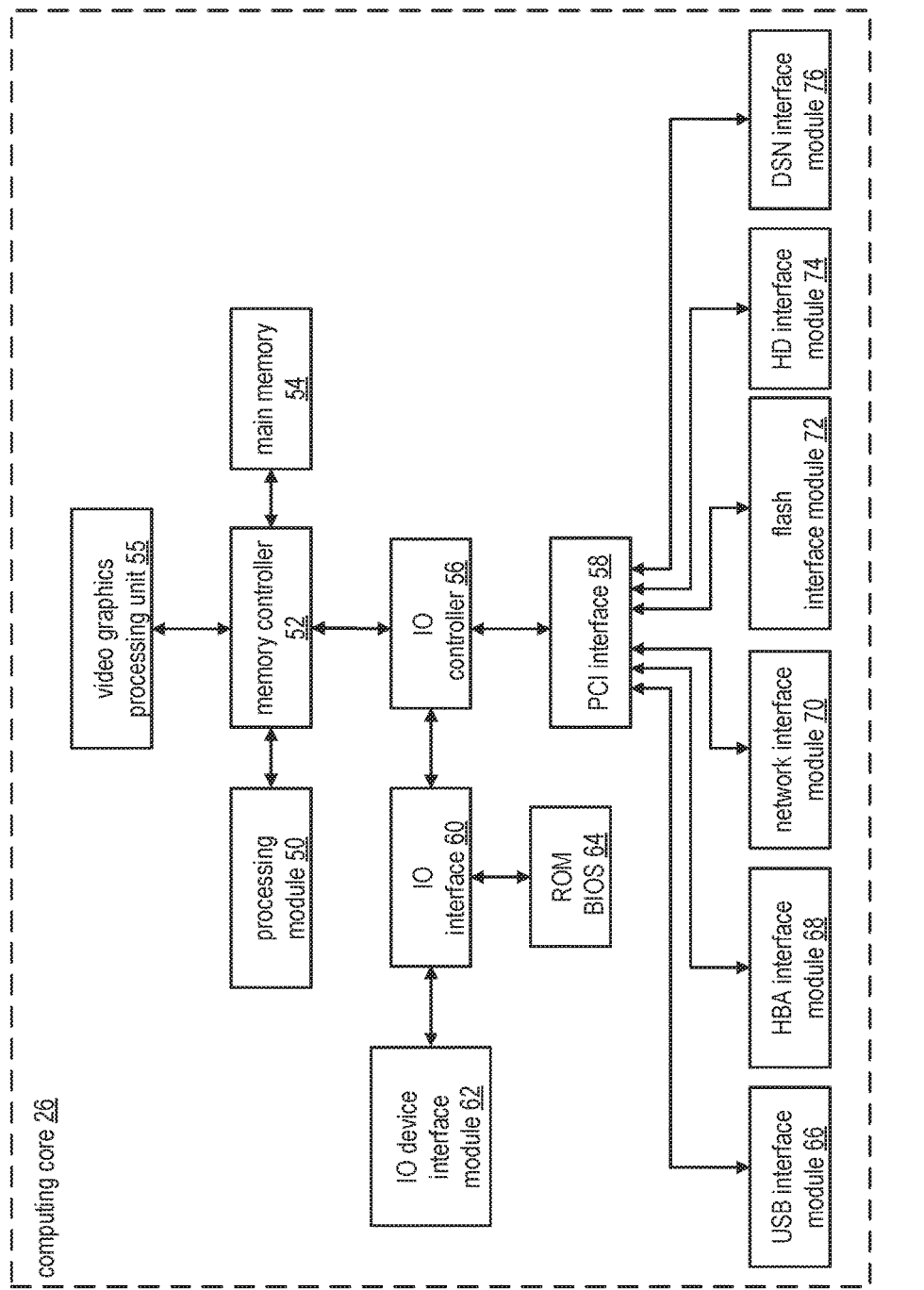
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM).

The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
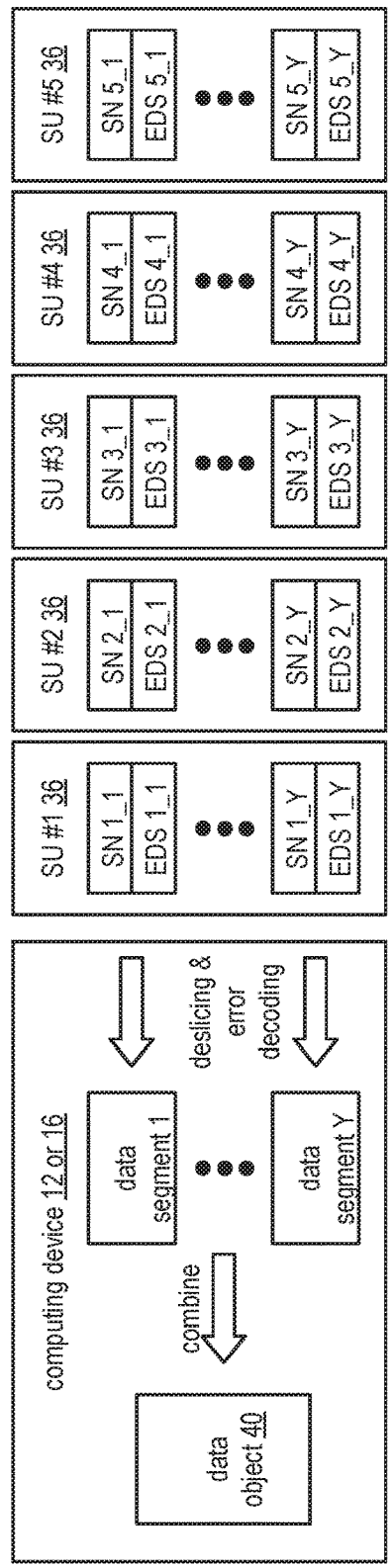
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
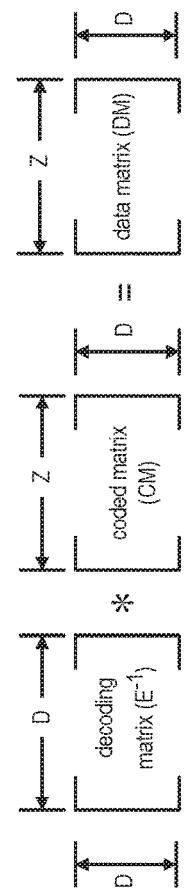
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In some examples, note that dispersed or distributed storage network (DSN) includes storage unit (SU) module that includes a plurality of storage units (SUs) such as SUs 36 (e.g., that may alternatively referred to a DSN module that includes a plurality of distributed storage and/or task (DST) execution units 36 (e.g., storage units (SUs), computing devices, etc.) that may be located at geographically different sites (e.g., one in Chicago, one in Milwaukee, etc.). Each of the SUs (e.g., DST execution units) is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Figure 9:
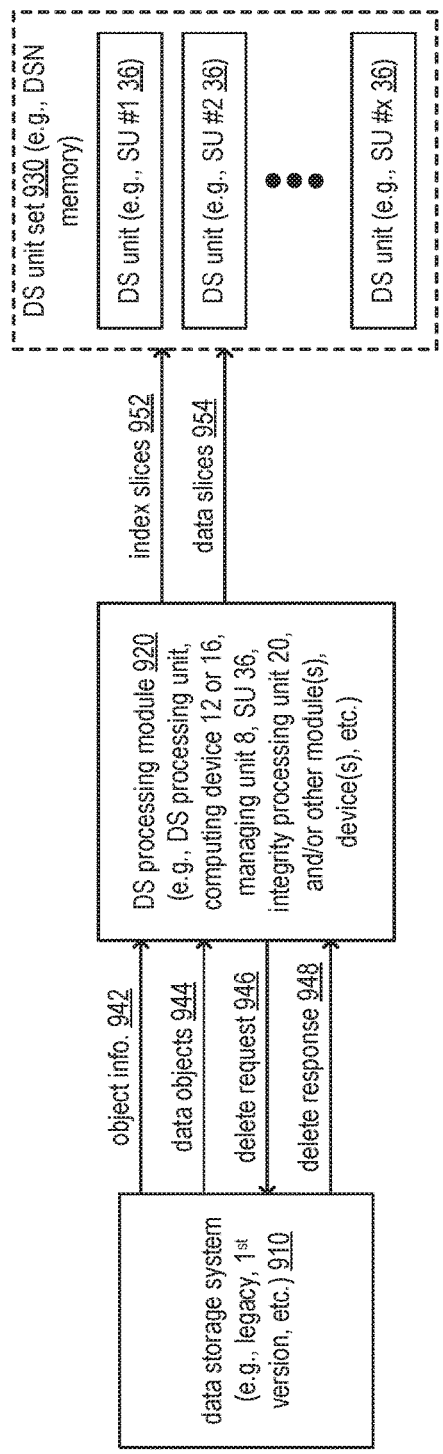
FIG. 9 is a schematic block diagram of another embodiment of a dispersed storage system or a dispersed or distributed storage network (DSN) in accordance with the present invention.

FIG. 9 is a schematic block diagram 900 of another embodiment of a dispersed storage system or a dispersed or distributed storage network (DSN) in accordance with the present invention. This diagram includes a schematic block diagram of another embodiment of a dispersed storage system that includes a legacy data storage system 910, a dispersed storage (DS) processing module 920, and a DS unit set 930. Note that the legacy data storage system 910 is a legacy data storage system with respect to a DSN, and the legacy data storage system 910 may be of various types including a RAID (redundant array of independent disks) system that stores one or more data objects 944. Note that the DS processing module 920 may be implemented using one or more or a DS processing unit, a computing device such as computing device 12 or 16, managing unit 8, a SU 36, integrity processing unit 20, and/or any one or more other modules, one or more other devices, and/or combination(s) thereof.

The DS unit set 930 includes a set of DS units (e.g., SUs 36) utilized to access slices stored in the set of DS units. The legacy data storage system 910 may be implemented utilizing any one of a variety of industry-standard storage technologies. The DS processing module may be implemented utilizing at least one of a distributed storage and task (DST) client module, a DST processing unit, a DS processing unit, a user device, a DST execution unit, and/or a DS unit. The system is operable to facilitate migration of data from the legacy data storage system 910 to the DS unit set 930.

The legacy data storage system 910 provides object information 942 and data objects 944 to the DS processing module. The object information 942 includes one or more of object names of data objects 944 stored in the legacy data storage system 910 and/or object sizes corresponding to the data objects 944. The processing module receives the object information 942 and the data objects 944 from the legacy storage system and stores at least some of the object information 942 in a dispersed index in the DS unit set 930. The dispersed index includes a plurality of index nodes and a plurality of leaf nodes where each of the plurality of index nodes and the plurality of leaf nodes are stored as a set of encoded index slices 952 in the DS unit set 930. Each leaf node of the dispersed index includes at least one entry corresponding to a data object stored in the DS unit set 930, where the entry includes an index key associated with the data object. The plurality of index nodes provide a hierarchical structure to the dispersed index to identify a leaf node associated with the data object based on the index key (e.g., searching through the hierarchy of index nodes based on comparing the index key to minimum index keys of each index node).

The storing in the dispersed index includes generating the index key associated with the corresponding data object for each portion of the object information 942 and adding/modifying an entry of the dispersed index to include one or more of the index key, the object name, the object size, and/or an index entry state. The index entry state includes an indication of a migration state with regards to migrating the data object from the legacy data storage system 910 to the DS unit set 930. The indication of migration state includes one of to be moved, moving, and moved. For example, the indication of migration state indicates to be moved when the data object has been identified for migration from the legacy data storage system 910 to the DS unit set 930 when the moving has not been initiated. The DS processing module initializes the index entry state to indicate to be moved. The initializing includes encoding a corresponding leaf node to produce a set of index slices 952 and outputting the set of index slices 952 to the DS unit set 930.

The DS processing module encodes the data object to produce data slices 954 and outputs the data slices 954 to the DS unit set 930 for storage. The DS processing module updates the index entry state for the data object to indicate the moving state (e.g., and not the to be moved state). When storage in the DS unit set 930 of a threshold number (e.g., a write threshold) of data slices 954 has been confirmed, the DS processing module issues a delete request 946 to the legacy data storage system 910 to delete the data object from the legacy data storage system 910. When deletion of the data object from the legacy data storage system 910 has been confirmed, the DS processing module updates the index entry state for the data object to indicate the moved state. The DS processing module detects confirmation of deletion of the data object from the legacy data storage system 910 when receiving a favorable delete response 948 from the legacy data storage system 910 with regards to the data object. The method of operation is discussed in greater detail with reference to FIG. 10.

In an example of operation and implementation, a computing device (e.g., computing device 12 or 16) includes an interface configured to interface and communicate with a dispersed or distributed storage network (DSN), a memory that stores operational instructions, and a processing module operably coupled to the interface and memory such that the processing module, when operable within the computing device based on the operational instructions, is configured to perform various operations.

For example, the computing device is configured to receive data object information for a data object that is stored within a data storage system. The computing device is also configured to store the data object information in a dispersed index of a dispersed or distributed storage network (DSN) that is different than the data storage system including to update an index entry state of the dispersed index to indicate the data object is to be moved. The computing device is also configured to dispersed error encode the data object to generate sets of encoded data slices (EDSs) corresponding to a plurality of data segments of the data object. Note that the data object is segmented into the plurality of data segments, and a data segment of the plurality of data segments is dispersed error encoded in accordance with dispersed error encoding parameters to produce a set of EDSs of the sets of EDSs.

The computing device is also configured to update the index entry state of the dispersed index to moving to indicate that the data object is moving. The computing device is also configured to distributedly store the sets of EDSs among a plurality of storage units (SUs) of the DSN. Then, when storage of a write threshold number of EDSs for the sets of EDSs is confirmed by the plurality of SUs, the computing device is also configured to update the index entry state of the dispersed index to indicate that storage of the data object in the DSN is done.

Also, note that the computing device can operate in a move mode or a copy mode. For example, when the computing device operates in a move mode, the computing device is configured to generate a delete data object request and to transmit the delete data object request to the data storage system after storage of the write threshold number of EDSs for the sets of EDSs is confirmed by the plurality of SUs. Then, when deletion of the data object is confirmed by the data storage system, the computing device is also configured to update the index entry state of the dispersed index to indicate that storage of the data object in the DSN is done and the data object is moved from the data storage system to the DSN.

In some examples, note that the sets of EDSs are of pillar width (e.g., each respective set of EDSs includes a common number of EDSs, and a number of sets of EDSs corresponds to a number of data segments into which the data objects is segmented into). Note also that a decode threshold number of EDSs of the set of EDSs of the sets of EDSs are needed to recover the data segment of the plurality of data segments, and a read threshold number of EDSs of the set of EDSs of the sets of EDSs provides for reconstruction of the data segment of the plurality of data segments. Also, note that the write threshold number of EDSs of the set of EDSs of the sets of EDSs provides for a successful transfer of the set of EDSs of the sets of EDSs from a first at least one location in the DSN to a second at least one location in the DSN.

In addition, in even other examples, note that the data storage system is a legacy data storage system with respect to the DSN. In some examples, the data storage system includes a RAID (redundant array of independent disks) system that stores the data object.

In some examples, the computing device is also configured to perform storage of a plurality of data objects that includes the data object within the DSN on a batch by batch basis. For example, each batch includes a respective subset of data objects of the plurality of data objects in some situations. If desired, each subset of data objects of the plurality of data objects include a substantially same number of data objects and/or a substantially same total size.

In even other examples, the computing device is configured to receive data object information for a data object that is stored within a data storage system. The computing device is also configured to store the data object information in a dispersed index of a dispersed or distributed storage network (DSN) that is different than the data storage system including to update an index entry state of the dispersed index to indicate the data object is to be moved. The computing device is also configured to dispersed error encode the data object to generate sets of encoded data slices (EDSs) corresponding to a plurality of data segments of the data object. Note that the data object is segmented into the plurality of data segments, and a data segment of the plurality of data segments is dispersed error encoded in accordance with dispersed error encoding parameters to produce a set of EDSs of the sets of EDSs.

The computing device is also configured to update the index entry state of the dispersed index to moving to indicate that the data object is moving. Then, the computing device is also configured to distributedly store the sets of EDSs among a plurality of storage units (SUs) of the DSN.

As mentioned, note that the computing device can operate in a move mode or a copy mode. For example, when the computing device operates in a copy mode, the computing device is configured to update the index entry state of the dispersed index to indicate that storage of the data object in the DSN is done when storage of a write threshold number of EDSs for the sets of EDSs is confirmed by the plurality of SUs.

Alternatively, when the computing device operates in a move mode, the computing device is configured to generate a delete data object request and to transmit the delete data object request to the data storage system after storage of the write threshold number of EDSs for the sets of EDSs is confirmed by the plurality of SUs. Then, when deletion of the data object is confirmed by the data storage system, the computing device is configured to update the index entry state of the dispersed index to indicate that storage of the data object in the DSN is done and the data object is moved from the data storage system to the DSN.

Note that the computing device may be located at a first premises that is remotely located from at least one SU of a plurality of SUs within the DSN. Also, note that the computing device may be of any of a variety of types of devices as described herein and/or their equivalents including a SU of any group and/or set of SUs within the DSN, a wireless smart phone, a laptop, a tablet, a personal computers (PC), a work station, and/or a video game device. Note also that the DSN may be implemented to include or be based on any of a number of different types of communication systems including a wireless communication system, a wire lined communication systems, a non-public intranet system, a public internet system, a local area network (LAN), and/or a wide area network (WAN).

Figure 10:
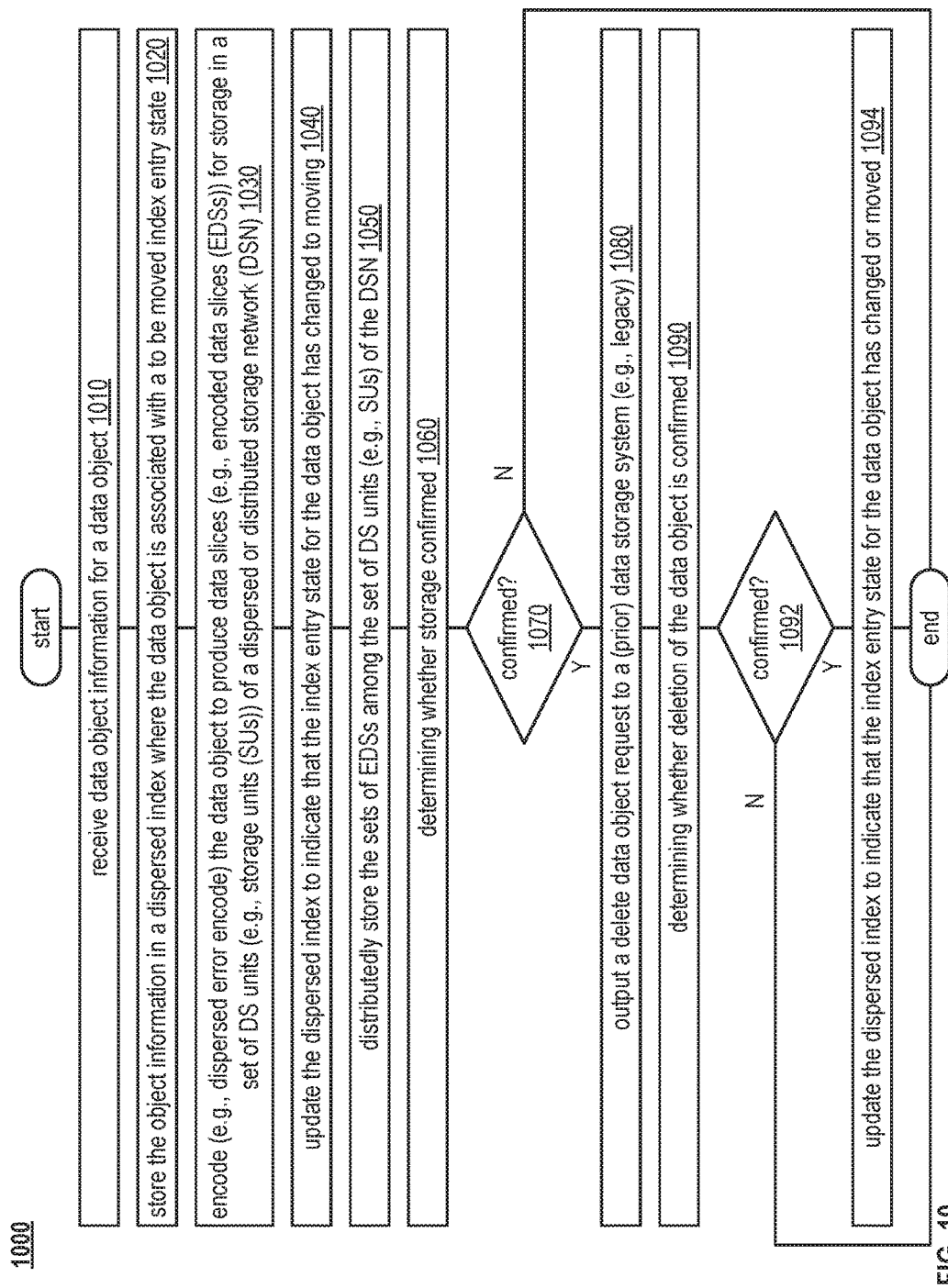
FIG. 10 is a flowchart illustrating an example of migrating data in accordance with the present invention.

FIG. 10 is a flowchart 1000 illustrating an example of migrating data in accordance with the present invention. The method 1000 begins at a step 1010 where a processing module (e.g., a dispersed storage (DS) processing module) receives object information for a data object (e.g., from a legacy data storage system). The receiving may include outputting and object information request, receiving the data object, receiving the object information, receiving a migration request, and initiating a query. The method 1000 continues at the step 1020 where the processing module stores the object information in a dispersed index where the data object is associated with a to be moved index entry state. The storing includes establishing an index key of the data object based on one or more of the data object, a data object size indicator, and/or a data object identifier of the data object and modifying/updating a leaf node entry of a leaf node corresponding to the data object to include the index key, the object information, and an index entry state to indicate to be moved.

The method 1000 continues at the step where the processing module encodes (e.g., dispersed error encodes) the data object to produce data slices for storage in a set of DS units (e.g., storage units (SUs)). The encoding includes encoding the data object using a dispersed storage error coding function to produce a plurality of encoded data slices, generating a plurality of slice names corresponding to the plurality of encoded data slices, generating a plurality of write slice requests that includes a plurality of slice names and the plurality of encoded data slices, and outputting the plurality of write slice requests to the DS unit set 930.

The method 1000 continues at the step 1040 where the processing module updates the dispersed index to indicate that the index entry state for the data object has changed to moving. For example, the processing module retrieves the leaf node (e.g., retrieves a set of index slices from the set of DS units, decodes the set of index slices to reproduce the leaf node), updates the index entry state to indicate moving to produce a modified leaf node, and stores the modified leaf node in the set of DS units (e.g., encodes the leaf node to produce a set of index slices, outputs the set of index slices to the set of DS units for storage therein).

The method 1000 continues at the step 1050 by distributedly store the sets of EDSs among DS units (e.g., storage units (SUs)) of the DSN. The method 1000 continues at the step 1060 by determining whether storage is confirmed. When storage is confirmed in step 1070, the processing module continues at the step 1080 and outputs a delete data object request to the legacy data storage system. For example, the processing module continues at the step 1090 receives at least a write threshold number of favorable write slice responses from the set of DS units, generates the delete data object request to include the data object identifier, and outputs the delete data object request to the legacy data storage system. Alternatively, when storage is not confirmed in step 1070, the processing module ends.

The method 1000 continues at the step 1090 by determining whether deletion of the data object is confirmed. When deletion of the data object is confirmed in step 1092, the processing module continues at the step 1094 updates the dispersed index to indicate that the index entry state for the data object has changed to moved. For example, processing module receives a delete data response from the legacy data storage system indicating that the deletion of the data object is confirmed, retrieves the leaf node, updates the index entry state to indicate moved to produce a further modified leaf node, and stores the further modified leaf node in the set of DS units. Alternatively, when deletion of the data object is not confirmed in step 1092, the processing module ends.

Figure 11:
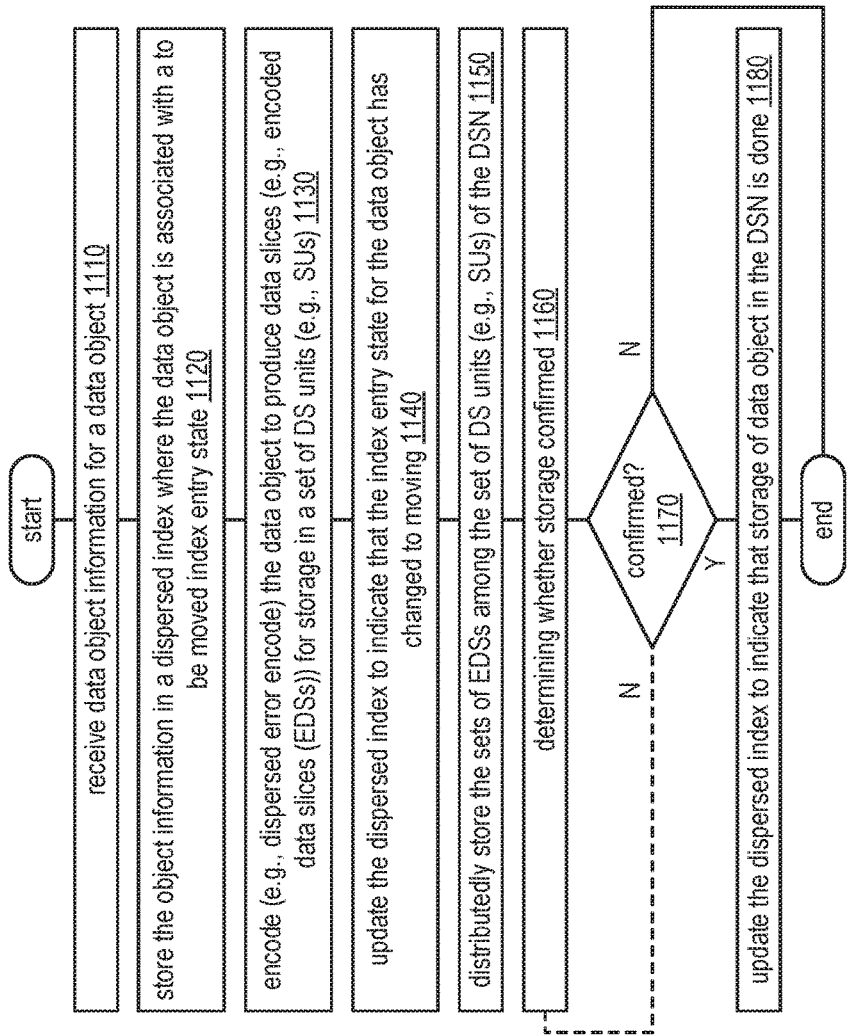
FIG. 11 is a diagram illustrating an embodiment of a method for execution by one or more computing devices in accordance with the present invention.

FIG. 11 is a diagram illustrating an embodiment of a method 1100 for execution by one or more computing devices in accordance with the present invention. The method 1100 operates in step 1110 by receiving (e.g., via an interface of a computing device that is configured to interface and communicate with a dispersed or distributed storage network (DSN)) data object information for a data object that is stored within a data storage system. The method 1100 then operates in step 1120 by storing the data object information in a dispersed index of a dispersed or distributed storage network (DSN) that is different than the data storage system including to update an index entry state of the dispersed index to indicate the data object is to be moved.

The method 1100 then operates in step 1130 by encoding (e.g., dispersed error encoding) the data object to generate sets of encoded data slices (EDSs) corresponding to a plurality of data segments of the data object. Note that the data object is segmented into the plurality of data segments, and a data segment of the plurality of data segments is dispersed error encoded in accordance with dispersed error encoding parameters to produce a set of EDSs of the sets of EDSs.

The method 1100 then operates in step 1140 by updating the index entry state of the dispersed index to moving to indicate that the data object is moving. The method 1100 then operates in step 1150 by distributedly storing the sets of EDSs among a plurality of storage units (SUs) of the DSN. The method 1100 continues at step 1010 by determining whether storage is confirmed. Confirmation of storage may be made by determining whether a write threshold number of EDSs for the sets of EDSs is confirmed by the plurality of SUs. When storage is confirmed in step 1170, the method 1100 continues at step 1080 operates by updating the index entry state of the dispersed index to indicate that storage of the data object in the DSN is done.

This disclosure presents, among other novel aspects, features, embodiments, examples, etc., a process to migrate data from a first named object system to a DSN begins by requesting a list of the object names and corresponding object sizes from the first system. The process then stores the object names and sizes as entries within a dispersed index.

For example, the entries in the index can be in one of three states (To-be-moved, Moving, and Done), and the state is used as a prefix to the key in the index. For example, the index key's may have the following form: _(object state)_ (object name)_(object size).

In a specific example: _STATE_TOBEMOVED_outline. doc_1782891, would be the index key to represent an object named "outline.doc", of size 1.78 MB, and in the state of not yet moved to the DSN memory. Initially, all entries in the dispersed index are named with the state corresponding to "to-be-moved". The migration process then begins the migration by listing at least one entry in the index with the prefix corresponding to the to-be-moved state. For each entry, it reads that object from the first named object system and then writes it into the DSN memory. Once this transfer is successful, the process renames the index entry to change its state to correspond to "moved". E.g., the entry may be renamed from _STATE_TOBEMOVED_outline.doc_ 1782891 to STATE_MOVING outline.doc_1782891. The migration may also be done in a copy mode or in a move mode. In the copy mode, this completes the migration of the object and the object may be moved directly to the "Done" state. Otherwise in the move mode, the object will then be deleted from the first named object system, before placing the object into the "Done state", e.g., _STATE_DONE_outline.doc_1782891. The process then continues with another batch of objects, which may be sized to contain a certain number of objects, or a certain total size (ascertainable from the entries in the dispersed index).

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
   an interface configured to interface and communicate with a dispersed or distributed storage network (DSN);
   memory that stores operational instructions; and
   a processing module operably coupled to the interface and to the memory, wherein the processing module, when operable within the computing device based on the operational instructions, is configured to:
   receive, from a data storage system, data object information for a data object that is stored within the data storage system;
   store the data object information in a dispersed index of a dispersed or distributed storage network (DSN) that is different than the data storage system including to update an index entry state of the dispersed index to indicate the data object is to be moved from the data storage system to the DSN;
   dispersed error encode the data object to generate sets of encoded data slices (EDSs) corresponding to a plurality of data segments of the data object, wherein the data object is segmented into the plurality of data segments, wherein a data segment of the plurality of data segments is dispersed error encoded in accordance with dispersed error encoding parameters to produce a set of EDSs of the sets of EDSs;
   update the index entry state of the dispersed index to moving to indicate that the data object is moving from the data storage system to the DSN;
   distributedly store the sets of EDSs among a plurality of storage units (SUs) of the DSN; and
   when storage of a write threshold number of EDSs for the sets of EDSs is confirmed by the plurality of SUs, update the index entry state of the dispersed index to indicate that storage of the data object in the DSN is done.

2. The computing device of claim 1, wherein the processing module, when operable within the computing device based on the operational instructions, is further configured to operate in a move mode including to:
   generate a delete data object request;
   transmit the delete data object request to the data storage system after storage of the write threshold number of EDSs for the sets of EDSs is confirmed by the plurality of SUs; and
   when deletion of the data object is confirmed by the data storage system, update the index entry state of the dispersed index to indicate that storage of the data object in the DSN is done and the data object is moved from the data storage system to the DSN.

3. The computing device of claim 1, wherein:
   the sets of EDSs are of pillar width,
   a decode threshold number of EDSs of the set of EDSs of the sets of EDSs are needed to recover the data segment of the plurality of data segments;
   a read threshold number of EDSs of the set of EDSs of the sets of EDSs provides for reconstruction of the data segment of the plurality of data segments; and
   the write threshold number of EDSs of the set of EDSs of the sets of EDSs provides for a successful transfer of the set of EDSs of the sets of EDSs from a first at least one location in the DSN to a second at least one location in the DSN.

4. The computing device of claim 1, wherein:
   the data storage system is a legacy data storage system with respect to the DSN; and
   the data storage system includes a RAID (redundant array of independent disks) system that stores the data object.

5. The computing device of claim 1, wherein the processing module, when operable within the computing device based on the operational instructions, is further configured to:
   perform storage of a plurality of data objects that includes the data object within the DSN on a batch by batch basis, wherein each batch includes a respective subset of data objects of the plurality of data objects, and wherein each subset of data objects of the plurality of data objects include at least one of a same number of data objects or a same total size.

6. The computing device of claim 1, wherein the computing device is located at a first premises that is remotely located from at least one SU of the plurality of SUs within the DSN.

7. The computing device of claim 1 further comprising:
   a SU of the plurality of SUs within the DSN, a wireless smart phone, a laptop, a tablet, a personal computers (PC), a work station, or a video game device.

8. The computing device of claim 1, wherein the DSN includes at least one of a wireless communication system, a wire lined communication systems, a non-public intranet system, a public internet system, a local area network (LAN), or a wide area network (WAN).

9. A computing device comprising:
   an interface configured to interface and communicate with a dispersed or distributed storage network (DSN);
   memory that stores operational instructions; and
   a processing module operably coupled to the interface and to the memory, wherein the processing module, when operable within the computing device based on the operational instructions, is configured to:
   receive, from a data storage system, data object information for a data object that is stored within the data storage system;
   store the data object information in a dispersed index of a dispersed or distributed storage network (DSN) that is different than the data storage system including to update an index entry state of the dispersed index to indicate the data object is to be moved from the data storage system to the DSN;
   dispersed error encode the data object to generate sets of encoded data slices (EDSs) corresponding to a plurality of data segments of the data object, wherein the data object is segmented into the plurality of data segments, wherein a data segment of the plurality of data segments is dispersed error encoded in accordance with dispersed error encoding parameters to produce a set of EDSs of the sets of EDSs;
   update the index entry state of the dispersed index to moving to indicate that the data object is moving from the data storage system to the DSN;
   distributedly store the sets of EDSs among a plurality of storage units (SUs) of the DSN; and
   when operating in a copy mode, when storage of a write threshold number of EDSs for the sets of EDSs is confirmed by the plurality of SUs, update the index entry state of the dispersed index to indicate that storage of the data object in the DSN is done;

when operating in a move mode:
generate a delete data object request;
transmit the delete data object request to the data storage system after storage of the write threshold number of EDSs for the sets of EDSs is confirmed by the plurality of SUs; and
when deletion of the data object is confirmed by the data storage system, update the index entry state of the dispersed index to indicate that storage of the data object in the DSN is done and the data object is moved from the data storage system to the DSN.

10. The computing device of claim 9, wherein:
the sets of EDSs are of pillar width,
a decode threshold number of EDSs of the set of EDSs of the sets of EDSs are needed to recover the data segment of the plurality of data segments;
a read threshold number of EDSs of the set of EDSs of the sets of EDSs provides for reconstruction of the data segment of the plurality of data segments; and
the write threshold number of EDSs of the set of EDSs of the sets of EDSs provides for a successful transfer of the set of EDSs of the sets of EDSs from a first at least one location in the DSN to a second at least one location in the DSN.

11. The computing device of claim 9, wherein:
the data storage system is a legacy data storage system with respect to the DSN; and
the data storage system includes a RAID (redundant array of independent disks) system that stores the data object.

12. The computing device of claim 9 further comprising:
a SU of the plurality of SUs within the DSN, a wireless smart phone, a laptop, a tablet, a personal computers (PC), a work station, or a video game device.

13. The computing device of claim 9, wherein the DSN includes at least one of a wireless communication system, a wire lined communication systems, a non-public intranet system, a public internet system, a local area network (LAN), or a wide area network (WAN).

14. A method for execution by a computing device, the method comprising:
receiving, from a data storage system and via an interface of the computing device that is configured to interface and communicate with a dispersed or distributed storage network (DSN), data object information for a data object that is stored within the data storage system;
storing the data object information in a dispersed index of a dispersed or distributed storage network (DSN) that is different than the data storage system including to update an index entry state of the dispersed index to indicate the data object is to be moved from the data storage system to the DSN;
dispersed error encoding the data object to generate sets of encoded data slices (EDSs) corresponding to a plurality of data segments of the data object, wherein the data object is segmented into the plurality of data segments, wherein a data segment of the plurality of data segments is dispersed error encoded in accordance with dispersed error encoding parameters to produce a set of EDSs of the sets of EDSs;
updating the index entry state of the dispersed index to moving to indicate that the data object is moving from the data storage system to the DSN;
distributedly storing the sets of EDSs among a plurality of storage units (SUs) of the DSN; and
when storage of a write threshold number of EDSs for the sets of EDSs is confirmed by the plurality of SUs, updating the index entry state of the dispersed index to indicate that storage of the data object in the DSN is done.

15. The method of claim 14, when operating in a move mode, further comprising:
generating a delete data object request;
transmitting, via the interface of the computing device, the delete data object request to the data storage system after storage of the write threshold number of EDSs for the sets of EDSs is confirmed by the plurality of SUs; and
when deletion of the data object is confirmed by the data storage system, updating the index entry state of the dispersed index to indicate that storage of the data object in the DSN is done and the data object is moved from the data storage system to the DSN.

16. The method of claim 14, wherein:
the sets of EDSs are of pillar width,
a decode threshold number of EDSs of the set of EDSs of the sets of EDSs are needed to recover the data segment of the plurality of data segments;
a read threshold number of EDSs of the set of EDSs of the sets of EDSs provides for reconstruction of the data segment of the plurality of data segments; and
the write threshold number of EDSs of the set of EDSs of the sets of EDSs provides for a successful transfer of the set of EDSs of the sets of EDSs from a first at least one location in the DSN to a second at least one location in the DSN.

17. The method of claim 14, wherein:
the data storage system is a legacy data storage system with respect to the DSN; and
the data storage system includes a RAID (redundant array of independent disks) system that stores the data object.

18. The method of claim 14 further comprising:
performing storage of a plurality of data objects that includes the data object within the DSN on a batch by batch basis, wherein each batch includes a respective subset of data objects of the plurality of data objects, and wherein each subset of data objects of the plurality of data objects include at least one of a same number of data objects or a same total size.

19. The method of claim 14, wherein the computing device includes a SU of the plurality of SUs within the DSN, a wireless smart phone, a laptop, a tablet, a personal computers (PC), a work station, or a video game device.

20. The method of claim 14, wherein the DSN includes at least one of a wireless communication system, a wire lined communication systems, a non-public intranet system, a public internet system, a local area network (LAN), or a wide area network (WAN).

* * * * *